United States Patent Office.

JEROME B. MELVIN, OF LOWELL, MASSACHUSETTS.

Letters Patent No. 110,665, dated January 3, 1871.

IMPROVEMENT IN COMPOSITIONS FOR ROOFING.

The Schedule referred to in these Letters Patent and making part of the same.

*To all whom it may concern:*

Be it known that I, JEROME B. MELVIN, of Lowell, in the county of Middlesex, and State of Massachusetts, have invented a new and useful Improvement in Composition for Roofing, of which the following is is a full, clear, and exact description.

This invention relates to that kind of composition-roofing, which is used or applied in a plastic state, requiring no heat to aid in liquefying or in mixing the ingredients to form the compound, but relying more upon the chemical affinity of the parts or ingredients to combine with each other, or the chemical action of such parts to unite and form a solid substance.

My improved roofing-composition is composed of animal or vegetable oil, protoxide of lead or litharge and sand or silex, and in about the following proportions:

To every one gallon of oil, (common cheap fish-oil being preferred,) I add about one pound of finely-powdered protoxide of lead or litharge, and mix them well together, and to this mixture I add sand or silex in sufficient quantity to form, when mixed, a thick plastic mass about the consistency of common plastering mortar, and these ingredients are mixed while cold or cool, requiring no artificial heat to combine them.

This plastic substance, thus combined by mixing the said ingredients, is applied to the previously-prepared roof, and spread with a trowel or other suitable instrument.

About one-fourth of an inch in thickness of the said plastic material is found to be sufficient to cover a well prepared roof, and if one thickness of good stout paper is first applied to cover the roof, a lesser thickness of said composition may answer the purpose, and in either case, a roof thus covered would be perfectly tight or free from leakage, growing harder and stronger by each day's drying or by chemical action, until it becomes, to all appearances, a complete sheet of stone, impervious to water and fire-proof, besides being very durable and reasonably cheap, and possessing the still greater advantage of the capacity of the ingredients to combine or unite without the aid of heat, which I consider of greater importance.

In making my said improved roofing-composition, I generally use that kind of fish-oil known as menhaden oil, by reason of its cheapness, but any other kind of fish-oil or linseed-oil, or other vegetable oil will answer the same purpose.

My improved composition is as well adapted for covering the vertical walls of buildings as for covering roofs, and whenever applied it soon assumes a uniform hardness, evidently produced by the chemical action of the combined ingredients.

I claim as my invention—

The composition of the herein-described ingredients in about the proportions specified, for the purpose and in the manner substantially as set forth.

JEROME B. MELVIN.

Witnesses:
  JOHN E. CRANE,
  WILLIAM R. CRANE.